June 14, 1960  R. W. HORNING  2,940,786
SELF ALIGNING COUPLING
Filed Jan. 20, 1958

INVENTOR:
Rodney W. Horning

AGENT

United States Patent Office 2,940,786
Patented June 14, 1960

2,940,786

SELF ALIGNING COUPLING

Rodney W. Horning, Manhattan Beach, Calif., assignor to Northrop Corporation, Beverly Hills, Calif., a corporation of California Filed Jan. 20, 1958, Ser. No. 709,937

3 Claims. (Cl. 287—87)

The present invention relates to coupling devices and more particularly to a rigid self-aligning coupler assembly adapted to transmit true linear vibrations from an exciter to a fixture or the like.

Prior art coupling devices, utilized to transmit linear vibrations from an exciter to a fixture or the like, are either of rigid or flexible construction, the latter construction functioning to compensate for limited linear or angular misalignments between the exciter and fixture. Prior art devices of the above types quite frequently function in a manner to provide unsatisfactory and objectionable results. Quite frequently the above devices do not transmit true vibrations as originated by the exciter and undesirable and objectionable moments may be introduced into the coupler which in turn further distort the vibrations as originated by the exciter.

Accordingly it is an object of the present invention to provide a coupler assembly adapted to provide a rigid connection between two components or the like and which automatically adjusts itself to compensate for limited angular, linear and rotary misalignment which may occur or be present between the components.

Another object is to provide a coupler assembly which will transmit vibrations between two components or the like without introducing undesirable moments in the coupler assembly and without distorting the vibration wave form as originated by one of the components.

Another object is to provide a coupler assembly which is of rigid construction, which is self-aligning, which will transmit true linear vibrations from one component to another, which is simple in design and rugged in construction and which is economical to manufacture.

Although the characteristic features of the present invention are particularly pointed out in the appended claims, the invention itself, also the manner in which it may be carried out, will be better understood by referring to the following description taken in connection with the accompanying drawings forming a part of this specification and in which:

Figure 1:
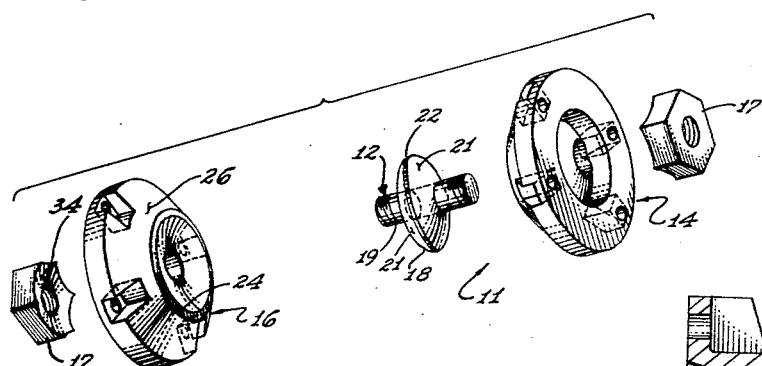
Figure 1 is an exploded view of the coupler assembly as disclosed herein.

Referring now to the drawings, the various components of the coupler assembly 11 include a tension-compression member 12, a pair of end bell members 14 and 16 and a pair of nut members 17—17. The member 12 consists of a compression load member 18 and a tension rod 19. For reference purposes the bell members are hereinafter referred to as right-hand and left-hand members 14 and 16, respectively, although their construction is identical.

Figure 2:
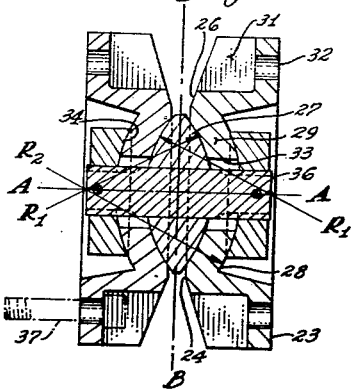
Figure 2 is a sectional view of the assembly as indicated by the line 2—2 in Figure 3, the components of the assembly being in their aligned or centered and assembled relation.
Figure 4:
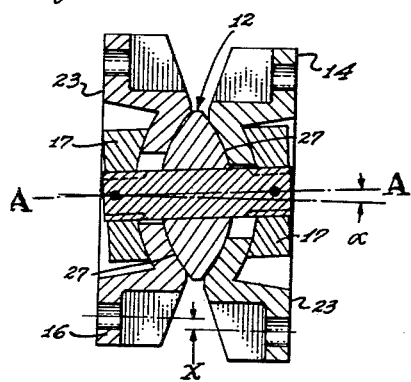
Figures 4 and 5 are sectional views similar to the view shown in Figure 2 but with portions of the assembly vertically and angularly misaligned, respectively.
Figure 3:
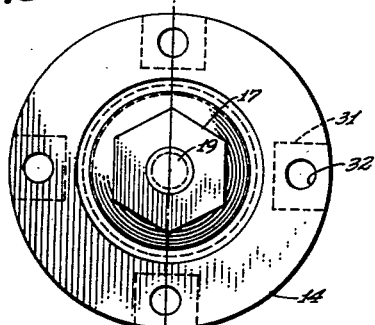
Figure 3 is an end view of the coupler assembly shown in Figure 2.
Figure 5:
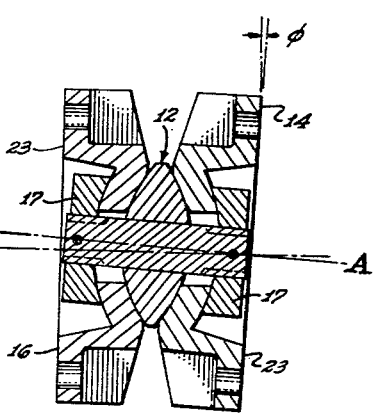

The tension-compression member 12 may be of unitary construction or it may be fabricated by securing the member 18 in a rigid and fixed relation on the rod 19 at its midpoint as best as seen in Figures 2, 4 and 5. In the embodiment shown the rod is circular in cross-section although this need not necessarily be the case. The axis of the rod is identified by the line A—A. The load member 18 is similar in construction to that of a throwing discus having its axis coincident with the axis A—A. The side faces 21—21 of the member 18 constitute identical spherical surfaces each having a radius $R_1$ as shown in Figure 2. The spheres, of which the surfaces 21—21 constitute a part, have their centers located at the respective ends of the rod 19 and on the axis A—A. The outer peripheral surface of the member 18 is cylindrical as indicated by the numeral 22, however, this surface may be dispensed with in which case the spherical surfaces 21—21 will continue until they intersect.

As mentioned above, the bell members 14 and 16 are of identical construction, therefore, a description of one will apply to the other and for purposes of illustration the right-hand member 14 will be described in detail. This member is generally of cylindrical configuration having one end which presents an annular plane surface 23 and the other end resembles a truncated cone which presents an annular plane surface 24, an annular sloping surface 26, and a concave spherical surface 27.

The concave spherical surface 27, having the same radius $R_1$ as the spherical surfaces 21—21, is provided in the truncated portion of the member 14 and opens on the surface 24. The end of the member 14, containing the surface 23, is indented and terminates in a spherical surface 28 having a radius $R_2$ as shown in Figure 2. The centers of the surfaces 27 and 28 coincide to render these surfaces concentric and define a wall 29 of non-varying thickness. Indentations 31 and bores 32 are provided in the member 14 substantially as shown and provide means whereby the latter may be secured to structure (not shown) in a manner presently explained. A central aperture 33 is provided in the wall 29 and is somewhat larger in diameter than the diameter of the rod 19 for a purpose which will be apparent presently.

The nut members 17—17 are substantially of conventional construction except that one of their end faces 34 is concave and constitutes a spherical surface having a radius $R_2$ and therefore has the same curvature as the surface 28.

In assembling the coupler 11 a bell member is positioned on each side of the compression member 18 with the respective ends of the rod 19 extending through the apertures 33. So positioned it will be apparent that the respective surfaces 21 and 27 will mate with each other in firm contacting relation. The nut members 17—17 are now secured on respective ends of the rod 19 in a conventional manner by means of threads formed on the ends of the rod. The nuts are held in fixed position on the rod by means of nylon members 36 which pass through bores in rod 19 to provide a friction lock.

Bolts or studs 37, the heads of which are bottomed in the indentations 31, extend through the bores 32 and provide means whereby the assembly 11 may be utilized to couple two components and effectively transmit linear vibrations therebetween. For example, the coupler assembly may be utilized to provide a connection between an exciter (not shown) and a fixture (not shown), the latter having an instrument or the like mounted thereon which is to be subjected to linear vibrations.

Referring now to Figure 2 it will be seen that all components of the coupler assembly 11 are symmetrically positioned with respect to the axis A—A of the rod 19. In this position, hereinafter referred to as the centered position of the coupler assembly, it will be noted that the annular surfaces 24—24 and a plane passing through the center of the compression member 18, as indicated by the line B—B in Figure 2, are normal to the axis A—A. It will also be noted that the rod 19 is of such a length that both of its ends are located inboard with respect to the annular surfaces 23—23. In this figure it will be apparent that if an exciter is attached to one of the bell members and a holding fixture to the other the assembly 11 will provide a rigid connection therebetween and linear vibrations originating with the exciter will be transferred in equal magnitude and without distortion to the fixture along the axis A—A.

In Figure 4 it will be seen that one of the bell members 23 has been linearly displaced an amount "X" with respect to the other. Under the conditions prevailing in Figure 4 it is to be understood that the bell members 14 and 16 are attached to rigid structure causing them to move in true vertical directions while being displaced the distance "X." In this figure it will also be assumed that the left-hand bell member 23 has been caused to move vertically upward the distance "X" while the right-hand bell member 23 retained its original position.

In view of the above it may be further assumed that a holding fixture (not shown) is attached to the left-hand bell member while an exciter (not shown) is attached to the right-hand bell member. Under these conditions it will be apparent that the aforementioned fixture has shifted upward during a vibrating test run. As the left-hand bell member 23 is caused to shift upward the lower portion of its spherical surface 27 will exert a dominating force on the lower left spherical surface 21 of the member 18 (as viewed in Figure 4). This force will cause the member 18 to rotate on the spherical surface 27 of the right-hand bell member 14 with the result that the tension-compression member 12 will rotate through an angle OC about the left-hand end of the rod 19. This movement and realignment of parts allows the annular surfaces 23–23 to maintain their parallel relation.

During the above movement and realignment of parts it will be seen that the apertures 33—33 were of sufficient size to allow the rod 19 to move through the angle OC without interference. Also the end of the rod 19 remains inboard with respect to the annular surfaces 23—23 and, therefore, does not interfere with the attaching portions of either the exciter or fixture. In this instance, although the annular surfaces 23—23 maintain their parallel relation, it will be apparent that there are no undesirable moments introduced in the coupler assembly and the latter will transmit linear vibrations from the exciter to the fixture without distortions.

In Figure 5 the right-hand bell member 14 has been moved through an angle $\phi$ with respect to the left-hand bell member. In this instance the movement and realignment of parts is quite similar to that described in connection with Figure 4 and a detailed description of this movement is, therefore, deemed unnecessary. It will also be apparent that in this instance the movement and realignment of parts has not introduced any undesirable moments in the coupler assembly while a rigid connection is maintained between the two components which are connected by the assembly. Accordingly, if the coupler assembly is utilized to transmit linear vibrations from an exciter to a fixture, linear vibrations will be transmitted from the exciter to the fixture without distortion.

In view of the foregoing discussion and description of the coupler assembly 11, it will be apparent that the assembly will also serve to provide a rigid connection in instances where linear and angular misalignment are both present. Under these conditions as in previous instances undesirable moments will not be introduced in the coupler assembly 11 and linear vibrations will be transmitted without distortion.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A self-aligning coupler assembly comprising: an elongated member including a disc-like center portion and rod-like end portions; said center portion being characterized by including a pair of convex spherical surfaces the centers of curvature of which are located on the axis of said disc-like center portion and on opposite sides of a plane passing through the center of said disc-like center portion and is perpendicular to the axis of said disc-like center portion; a pair of end bells each having a circular aperture formed therein of a diameter exceeding the greatest cross-sectional measurement of said end portions; said end bells being further characterized in that each includes concentric convex and concave spherical surfaces the centers of curvature of which are located on the axis of the respective aperture formed therein; said end bells being mounted on said member on each side of said disc-like center portion with said end portions extending through said apertures and the concave surfaces of said end bells contacting the convex surfaces of said disc-like center portion; and a pair of nut members, each defining a concave spherical surface of less extent than respective convex surfaces of said end bells, secured on said end portions with the concave surfaces of said nut members contacting the respective convex surfaces of said end bells.

2. A self-aligning coupler assembly comprising: an elongated member including a disc-like center portion and rod-like end portions which are circular in cross-section; said disc-like center portion being characterized by including a pair of convex spherical surfaces the centers of curvature of which lie on the axis of said disc-like center portion and on opposite sides of a plane passing through the center of said disc-like center portion and is perpendicular to the axis of said disc-like center portion; a pair of end members each having a circular aperture formed therein of a diameter exceeding the diameter of said end portions; said end members being further characterized in that each includes concentric convex and concave spherical surfaces the centers of curvature of which lie on the axis of the respective aperture formed therein; said end members being mounted on each side of said disc-like center portion with said concave surfaces thereof contacting the convex surfaces of said disc-like center portion and with said end portions extending through said apertures; and a pair of nut members, each defining a concave spherical surface of less extent than respective convex surfaces of said end members, secured on said end portions with the concave surfaces of said nut members contacting the respective convex surfaces of said end members.

3. A self-aligning coupler assembly as set forth in claim 2: further characterized in that the boundaries of said spherical surfaces on said disc-like center portion constitute circles of predetermined diameters and the boundaries of said concave surfaces on said end members constitute circles of less diameter than a respective diameter defining the spherical surfaces on said disc-like center portion.

References Cited in the file of this patent

UNITED STATES PATENTS

| | | |
|---|---|---|
| 938,219 | Crumb | Oct. 26, 1909 |
| 2,377,417 | Harris | June 5, 1945 |

FOREIGN PATENTS

| | | |
|---|---|---|
| 271,417 | Great Britain | July 21, 1927 |
| 468,948 | Germany | Dec. 3, 1928 |
| 610,718 | Great Britain | Oct. 20, 1948 |